(12) United States Patent
Ishikawa

(10) Patent No.: US 6,539,266 B1
(45) Date of Patent: Mar. 25, 2003

(54) COMPUTER SYSTEM, METHOD OF EXECUTING COMPUTER PROGRAM, AND COMPUTER PROGRAM STORAGE MEDIUM

(75) Inventor: Hirotaka Ishikawa, Tokyo-to (JP)

(73) Assignees: Konami Co., Ltd., Tokyo-to (JP); Konami Computer Entertainment Tokyo Co., Ltd., Tokyo-to (JP)

( * ) Notice: Subject to any disclaimer, the term of this patent is extended or adjusted under 35 U.S.C. 154(b) by 0 days.

(21) Appl. No.: 09/541,585

(22) Filed: Apr. 3, 2000

(30) Foreign Application Priority Data

Apr. 9, 1999 (JP) ............................. 11-103256

(51) Int. Cl.[7] .............................................. G05B 11/01
(52) U.S. Cl. .............................. 700/23; 700/21; 700/7; 700/79; 700/86; 700/87; 700/89; 712/215; 703/22; 714/27; 714/25; 714/703; 714/732
(58) Field of Search .......................... 700/7, 18, 21–23, 700/79, 86, 87, 88, 89; 714/724, 25, 27, 703, 732; 713/100, 200; 709/107, 227; 703/22; 707/100; 712/24, 215

(56) References Cited

U.S. PATENT DOCUMENTS

| | | | | |
|---|---|---|---|---|
| 4,251,885 A | * | 2/1981 | Dodt et al. ................... 714/50 |
| 5,442,645 A | * | 8/1995 | Ugon et al. ................... 380/29 |
| 5,561,788 A | * | 10/1996 | Letwin ......................... 703/22 |
| 5,598,530 A | | 1/1997 | Nagae ......................... 714/21 |
| 5,701,506 A | * | 12/1997 | Hosotani ..................... 711/170 |
| 5,745,725 A | * | 4/1998 | Simpson ..................... 712/214 |
| 5,758,163 A | * | 5/1998 | Safonov ...................... 717/131 |
| 5,781,738 A | * | 7/1998 | Corn et al. .................. 709/227 |
| 6,038,667 A | * | 3/2000 | Helbig, Sr. .................. 713/200 |

OTHER PUBLICATIONS

Ohlsson, J. et al: "Implicit Signature Checking" International Symposium on Fault Tolerant Computing, U.S., Los Alamitos, IEEE Comp. Soc. Press, vol. Symp. 25, Jun. 27, 1995, pp. 218–227.

* cited by examiner

*Primary Examiner*—Ramesh Patel
(74) *Attorney, Agent, or Firm*—Jordan and Hamburg LLP

(57) ABSTRACT

A computer system for detecting alteration of programs in which a plurality of check program portions are read from a storage medium which carries computer programs including the check program portions. Each check program portion is executed to detect alteration of at least one other check program portion.

13 Claims, 4 Drawing Sheets

MONITORING MODULE A

MONITORING MODULE B

COMPUTER SYSTEM, METHOD OF EXECUTING COMPUTER PROGRAM, AND COMPUTER PROGRAM STORAGE MEDIUM

BACKGROUND OF THE INVENTION

1. Field of the Invention

This invention relates to a technique for preventing program from being altered or modified.

2. Description of Related Art

Relating to program to be executed on a general computer system, there is such an important problem that a wicked user illegally alters the contents of the program and uses it. Particularly, program recorded on a storage medium such as a CD-ROM for sale is easily alterable. In order to prevent such illegal alteration of program, there is known a method of using a check program to check whether or not the program has been altered. For example, this is achieved as follows. First, a duplicate of a portion of a true program to be protected is prepared, and it is compared or collated with the corresponding portion of the program to be checked. If they are identical, the program is judged to be true and is executed. If they are not identical, the program is judged to be an altered one, and the execution of the program is inhibited. The portion to be compared or collated may be a part of the program itself or may be some codes prepared for the purpose of checking. Further, the portion to be compared may be encrypted or compressed, if necessary.

Examples of technique for preventing illegal alteration of program are disclosed in Japanese examined patent publication No. 62-3460, Japanese laid-open patent application No. 10-187435, and Japanese Patents Nos. 2621799 and 2738375.

Recently, however, some wicked users alter and disable such check program itself. In that case, the check method described above cannot prevent illegal alteration of program and execution of illegally-altered program.

SUMMARY OF THE INVENTION

It is an object of the present invention to provide a technique for preventing the illegal alteration of program, which is capable of reliably preventing the execution of the altered program even if the check program itself is altered.

According to one aspect of the present invention, there is provided a computer system including: reading means for reading a plurality of check program portions from a storage medium which carries computer program including the plurality of check program portions; and check program executing means for executing each of the check program portions, wherein each of the check program executing means detects alteration of at least one of other check program portions.

In the computer system thus configured, each of the check program executing means has a function to detect alteration of at least one other check program portion. Therefore, if one or some of the check program portions is altered, it can be detected by other check program portion. This can enhance the prevention of the alteration of program and use of the altered program.

The computer system may further include storage means for storing at least one check program prepared in advance. The check program portion stored in the storage means may detect alteration of at least one of the plurality of check program portions, and at least one of the plurality of check program portions may detect alteration of the check program portion stored in the storage means. By this, the multiple alteration detection can be achieved by the check program portion not only for the check program portions recorded on the storage medium but for the check program portion prepared in advance in the storage means of the computer system. Therefore, the alteration of program and use of the altered program may be avoided effectively.

The computer system may further include control means for enabling execution of the computer program when the check program executing means does not detect alteration of any one of the check program portions after executing all of the check program portions. By this, one of the check program portions can detect alteration unless all of the check program portions are successfully altered. Therefore, the alteration of program and use of the altered program may be avoided effectively.

The plurality of check program portions may be linked to form a loop structure such that each of the plurality of check program portions detects alteration of other one check program portion. Alternatively, the plurality of check program portions may be linked to form a tree structure such that each of the plurality of check program portions detects alteration of check program portions which belong to the each of the plurality of check program portions. By making the linked structure of the plural check programs complicated, the alteration of program and use of the altered program becomes practically impossible.

According to another aspect of the present invention, there is provided a method of executing computer program including the steps of: reading step for reading a plurality of check program portions from a storage medium which carries computer program including the plurality of check program portions; and check program executing step for executing all of the check program portions, wherein the check program executing step detects alteration of at least one of other check program portions.

In accordance with the above method, the check program executing step has a function to detect alteration of at least one other check program portion. Therefore, if one or some of the check program portions is altered, it can be detected by other check program portion. This can enhance the prevention of the alteration of program and use of the altered program.

The method may further include reading step for reading the check program portion from a storage means which stores at least one check program prepared in advance. The check program executing step may execute the check program portion stored in the storage means to detect alteration of at least one of the plurality of check program portions and may execute at least one of the plurality of check program portions to detect alteration of the check program portion stored in the storage means. By this, the multiple alteration detection can be achieved by plural check program portions not only for the check program portions recorded on the storage medium but for the check program portion prepared in advance in the storage means of the computer system. Therefore, the alteration of program and use of the altered program may be avoided more effectively.

The method may further include control step for enabling execution of the computer program when the check program executing step does not detect alteration of any one of the check program portion after executing all of the check program portions. By this, one of the check program portions can detect alteration unless all of the check program portions are successfully altered. Therefore, the alteration of program and use of the altered program may be avoided effectively.

According to still another aspect of the present invention, there is provided a storage medium readable by a computer, including: computer program; and a plurality of check program portions which allow the computer to perform as a check program executing means for detecting alteration of at least one of other check program portions.

Thus, each of the check program executing means has a function to detect alteration of at least one other check program portion. Therefore, if one or some of the check program portions is altered, it can be detected by other check program portion. This can enhance the prevention of the alteration of program and use of the altered program.

The storage medium may further include a program which allow the computer to perform as control means for enabling execution of the computer program when the check program executing means does not detect alteration of any one of the check program portions after executing all of the check program portions. By this, the multiple alteration detection can be achieved by plural check program portions not only for the check program portions recorded on the storage medium but for the check program portion prepared in advance in the storage means of the computer system. Therefore, the alteration of program and use of the altered program may be avoided more effectively.

The nature, utility, and further features of this invention will be more clearly apparent from the following detailed description with respect to the preferred embodiments of the invention when read in conjunction with the accompanying drawings briefly described below.

DETAILED DESCRIPTION OF THE PREFERRED EMBODIMENTS

The preferred embodiment of the present invention will now be described below with reference to the attached drawings.

Figure 1:
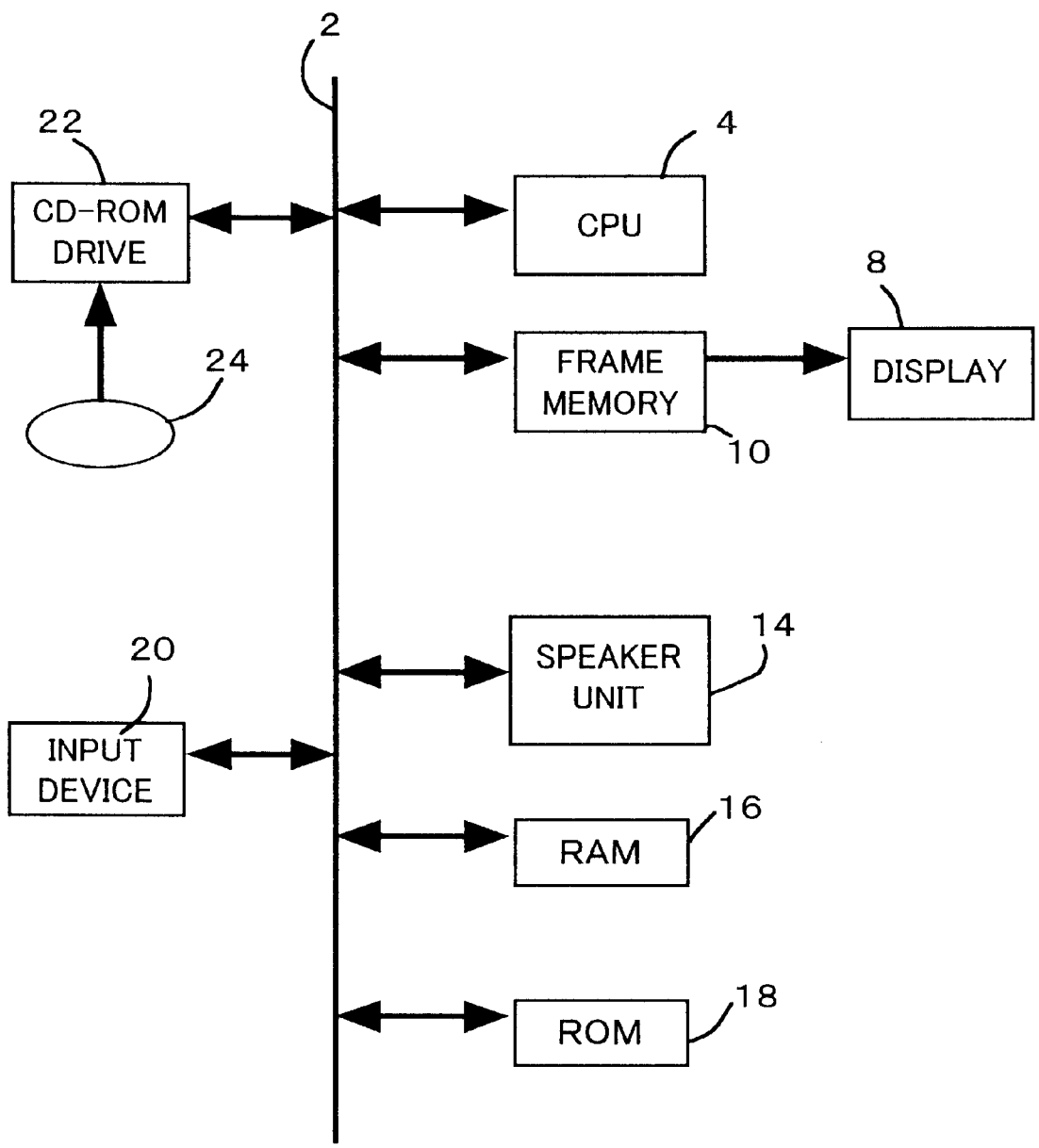
FIG. 1 is a block diagram showing a configuration of a computer system to which the present invention is applied.

FIG. 1 shows a schematic configuration of the computer system according to an embodiment of the present invention. As shown, the computer system includes a CPU 4, a frame memory 10, a speaker unit 14, a RAM 16, a ROM 18, an input device 20 and a CD-ROM drive 22. Those components are all connected to a bus 2. The CD-ROM 24, on which program is recorded, is inserted into the CD-ROM drive 22. At the time of execution, the program recorded on the CD-ROM 24 is written into the RAM 16 and is then executed under the control of the CPU 4. The ROM 18 stores programs necessary for the operation of the system in advance. If necessary, the ROM 18 also stores module (described later in detail) for checking whether or not the program recorded on the CD-ROM 24 has been altered. The input device 20 generally includes a keyboard, a mouse, etc., and is used by a user to input necessary information and/or instruction. When simulation software or game software recorded on the CD-ROM 24 is executed, a joy stick or a game controller device may be used as the input device 20. The frame memory 10 is connected to the display 8. The frame memory 10 temporarily stores picture data to be displayed on the display 8. The picture data stored in the frame memory 10 is displayed on the display 8 under the control by the CPU 4. The speaker unit 14 controls audio output under the control by the CPU 4.

Next, the description will be given of the outline of the multiple program monitoring method according to the present invention by referring to FIG. 2. In the present invention, a plurality of check programs for monitoring and checking illegal alteration of program are prepared, and each check program monitors one or some of the other check programs.

Figure 2:
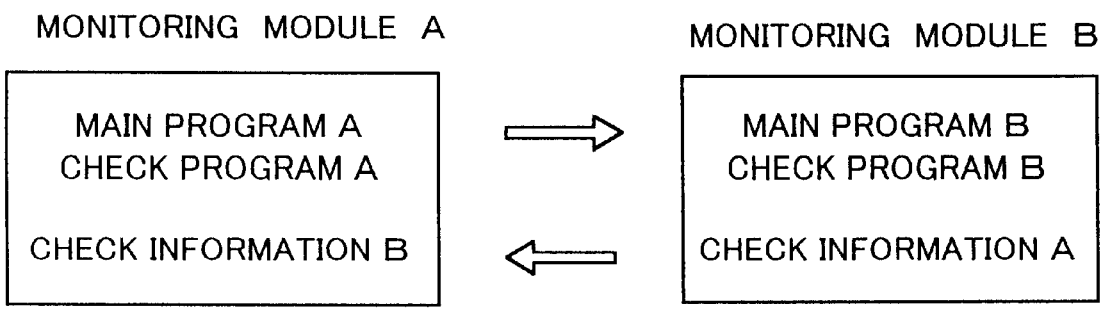
FIG. 2 is a schematic diagram showing an example of multiple monitoring structure according to the present invention.

FIG. 2 shows the most simple case in which two monitoring modules mutually monitor each other. The monitoring modules A and B include main programs A and B, which are portions of the programs to be protected, respectively. For example, the main programs A and B may be description of an important portion of the program to be protected. The monitoring modules A and B include check programs A and B, respectively, to perform mutual monitoring. In other words, the check program A in the monitoring module A monitors alteration of the main program B and the check program B in the module B, and the check program B in the monitoring module B monitors alteration of the main program A and the check program A in the monitoring module A. The monitoring module B includes check information A which is necessary for the check operation performed by the check program A, and the monitoring module A includes check information B which is necessary for the check operation performed by the check program B. It is noted that some kind of programs do not need check information.

Now, it is assumed that images of the main programs are prepared as the check information and that the check programs A and B check alteration by comparing or collating the main programs with those images. Namely, the check information A in the monitoring module B is the image of the main program A, and the check information B in the monitoring module A is the image of the main program B. First, the check program A compares the check information A in the module B with the main program A, and determines that alteration has been made if those two are not identical. Similarly, the check program B compares the check information B in the module A with the main program B, and determines that alteration has been made if those two are not identical. If those two are not identical at this stage, it is highly likely that the contents of the program recorded on the storage medium such as CD-ROM has been altered. Therefore, by this monitoring method, alteration of the storage medium itself, such as CD-ROM, can be detected. With this method, the main program is not executed unless both of the check programs A and B are successfully deciphered and altered by a wicked user.

If alteration is not detected by the above mentioned check, the contents of the main programs A and B are written into the memory (i.e., RAM 18 shown in FIG. 1) to execute those programs. Then, the check programs A and B compare the contents of the main programs A and B written into the memory with the check information A and B. If at least one of them is not identical, it means that the contents of the memory, i.e., the program written into the memory, has been altered after the program is written into the memory.

Therefore, the execution of the main programs A and B written into the memory is inhibited. Thus, the execution of the altered program is prevented. In addition, by performing double check for the program as it is in the storage medium and after it is written into the memory, alteration possibly made in two different situations may be detected, thereby enabling more reliable alteration prevention.

Next, variations of the multiple monitoring by plural monitoring modules will be described. The mutual monitoring shown in FIG. 2 is the most simple example. In the present invention, the protection of the check program against illegal alteration may be enhanced by combining a plurality of monitoring modules to form more complicated monitoring structure.

Figure 3:
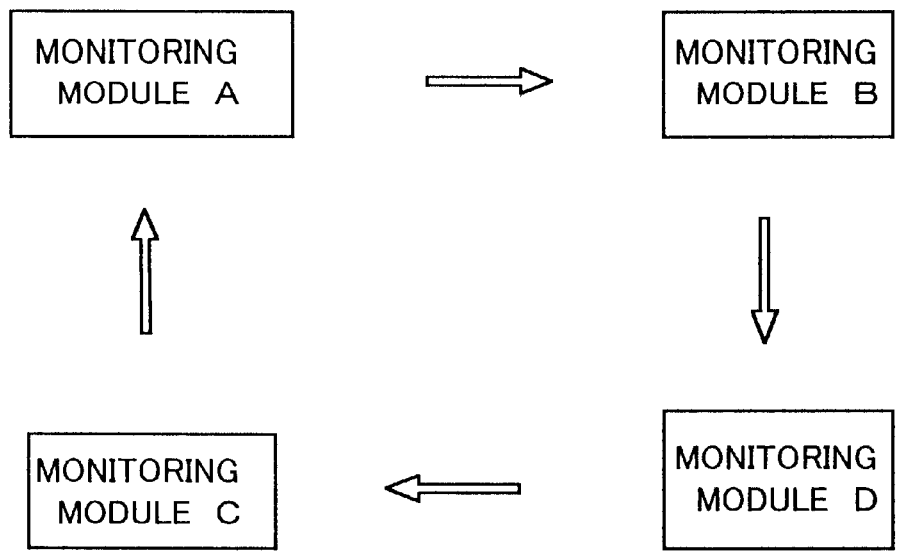
FIG. 3 is a schematic diagram showing another example of multiple monitoring structure according to the present invention.
Figure 4:
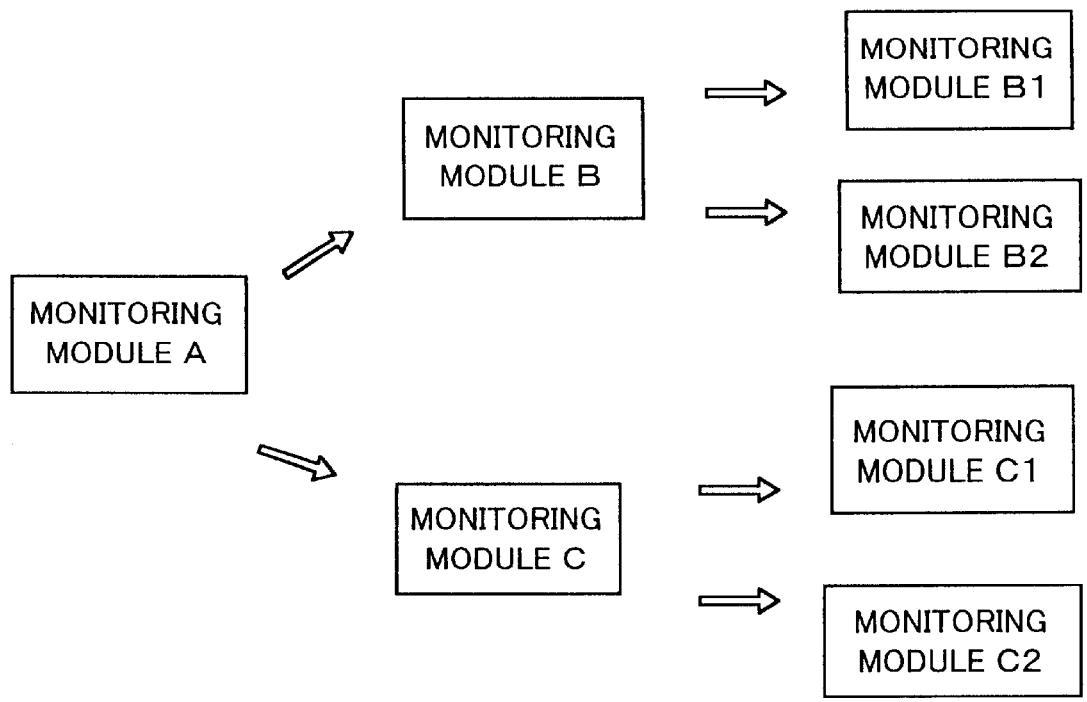
FIG. 4 is a schematic diagram showing still another example of multiple monitoring structure according to the present invention.
Figure 5:
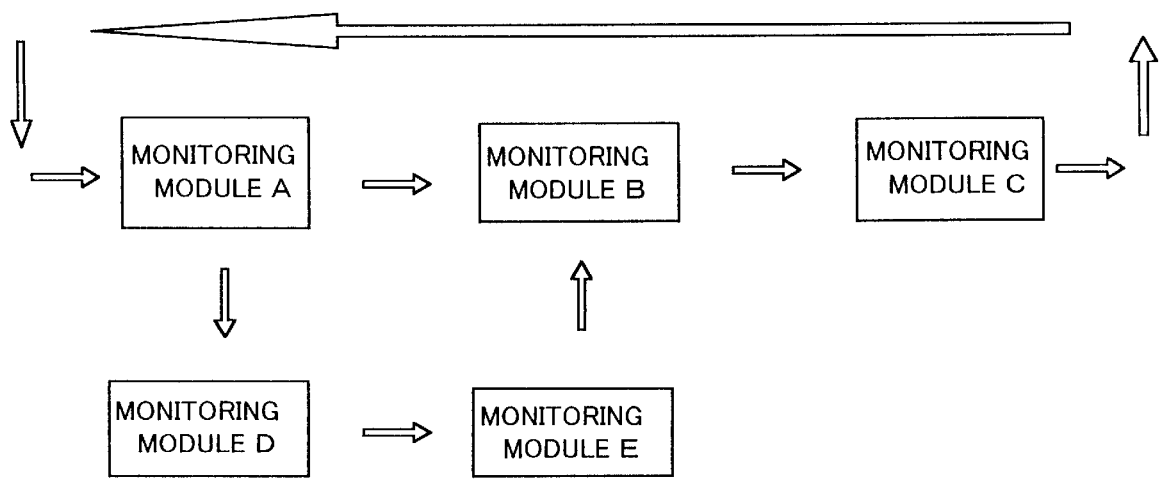
FIG. 5 is a schematic diagram showing still another example of multiple monitoring structure according to the present invention.

For example, FIG. 3 shows a ring-type (or loop-type) monitoring structure in which four monitoring modules are linked in a ring or loop form, and FIG. 4 shows a tree-type monitoring structure in which plural monitoring modules are combined to form a tree structure. FIG. 5 shows a complex-type monitoring structure including plural rings or loops of monitoring modules. By forming the complicated monitoring structure by a plurality of monitoring modules, the alteration can be reliably detected unless all of the check programs in all monitoring modules are successfully altered. Namely, alteration of a certain one of the check programs can be detected by the monitoring module which monitors the monitoring module including the check program thus altered. Therefore, any one of the monitoring modules can detect alteration of the program unless a wicked user trying to illegally alter the program successfully detects the presence of all monitoring modules, analyzes and recognizes the monitoring structure (i.e., specific linking manner) and then disables all check programs in all monitoring modules at the same time. By making the monitoring structure including plural monitoring modules more complicated, it is practically impossible to alter all check programs successfully, and hence illegal alteration of programs and its illegal use can be prevented almost perfectly.

In the example shown in FIG. 2, each monitoring module includes both the main program to be protected and the check program. However, it is not always necessary that the monitoring module includes the main program. Namely, a monitoring module including no main program may be prepared for the purpose of monitoring only. For example, a program may be configured to include plural monitoring modules, each including only check programs, in plural different portions of the program so that, if one of the monitoring modules detects alteration, the execution of the program after that portion is inhibited.

Next, the description will be given of a concrete monitoring method carried out by the check program. In the present invention, any one of various program alteration check methods already known may be introduced. In the example of FIG. 2, the monitored-side module is configured to include image of a program included in a monitoring-side module so as to detect alteration by detecting the identity of the program and its image. Alternatively, a certain check code may be included in each module in place of the above image so that program alteration can be monitored by detecting the identity of those check codes. Further, alteration can be detected by examining check sum of a part or all of the program.

Next, examples of the operation of the module in the system shown in FIG. 1 will be described. The module may be stored, in advance, on the CD-ROM 24 or in the ROM 18.

As an example, plural monitoring modules are stored in the ROM 18 of the system. A user who is going to alter the program tries to decipher and alter the check program in the module stored in the ROM 18. However, unless he successfully deciphers the monitoring structure of all of the plural modules and alters all of the check program, one or some of the modules detects the alteration of the program.

As another example, a part of plural monitoring modules is stored in the CD-ROM 24 together with the main program and the remaining parts of the plural monitoring modules are stored in the ROM 18. The monitoring module stored in the CD-ROM 24 is written into the RAM 16 of the system together with the main program when executing the main program. Then, the check program of each monitoring module starts operation. In this case, one or some of the monitoring modules detect alteration and inhibits the execution of the main program stored in the CD-ROM 24 unless a wicked user successfully alters and disables all check programs in the plural monitoring modules written into the RAM 18 and stored in the ROM 18.

As a still another example, all of plural monitoring modules may be recorded on the CD-ROM 24. Also in this case, each monitoring module is written into the RAM 16, and the check process is executed. Therefore, the execution of the main program is inhibited unless all check programs are successfully altered and disabled.

In any one of the above three cases, the check program can perform the above-mentioned double check against the program as it is stored in the CD-ROM or ROM and after it is written into the RAM.

While the above described embodiment uses CD-ROM as a storage medium of the program, the application of the present invention is not limited to this feature. Namely, the present invention is applicable to other various storage medium such as MO, DVD, etc., and is also applicable to a program which is transferred to a hard-disk via a certain communication means.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 11-103256 filed on Apr. 9, 1999 including the specification, claims, drawings and summary is incorporated herein by reference in its entirety.

What is claimed is:

1. A computer system comprising:
   a storage medium having a computer program including a plurality of check program portions;
   reading means for reading the plurality of check program portions from the storage medium; and
   check program executing means for executing each of the check program portions, wherein each of the check program executing means is arranged to execute one of the check program portions to detect alteration of at least one other check program portion.

2. A computer system according to claim 1, further comprising storage means for storing at least one of the check program portions prepared in advance, wherein the check program portion stored in the storage means detects alteration of at least one of the plurality of check program portions, and wherein at least one of the plurality of check program portions detects alteration of the check program portion stored in the storage means.

3. A computer system according to claim 1, further comprising control means for enabling execution of the computer program when the check program executing means does not detect alteration of any one of the check program portions after executing all of the check program portions.

4. A computer system according to claim 1, wherein the plurality of check program portions are linked to form a loop structure.

5. A computer system according to claim 1, wherein the plurality of check program portions are linked to form a tree structure.

6. A method for executing a computer program, comprising the steps of:

provisioning a storage medium having a computer program including a plurality of check program portions;

reading the plurality of check program portions from the storage medium; and executing each of the check program portions to detect alteration of at least one other check program portion.

7. A method according to claim 6, further comprising storing a check program portion prepared in advance in a storage means, reading the check program portion from the storage means, executing the check program portion stored in the storage means to detect alteration of at least one of the plurality of check program portions and executing at least one of the plurality of check program portions to detect alteration of the check program portion stored in the storage means.

8. A method according to claim 6, further comprising enabling execution of the computer program when the check program executing step does not detect alteration of any one of the check program portion after executing all of the check program portions.

9. A storage medium readable by a computer, comprising:

a computer program; and a plurality of check program portions which allow the computer to perform as a check program executing means for detecting alteration of at least one other check program portion.

10. A storage medium according to claim 9, further comprising a program which allows the computer to perform as control means for enabling execution of the computer program when the check program executing means does not detect alteration of any one of the check program portions after executing all of the check program portions.

11. A computer system comprising:

a storage medium having a plurality of computer programs, each of the computer programs including a check program; and check program executing means for executing each of the check programs to detect alteration of at least one other check program.

12. A computer system according to claim 11, wherein each of the computer programs is stored in a monitoring module including a main program to be protected from alteration and the respective check program.

13. A computer system according to claim 12, wherein each of the monitoring modules includes check information for the check operation performed by the check program in one of the other monitoring modules.

* * * * *